Patented Nov. 16, 1937

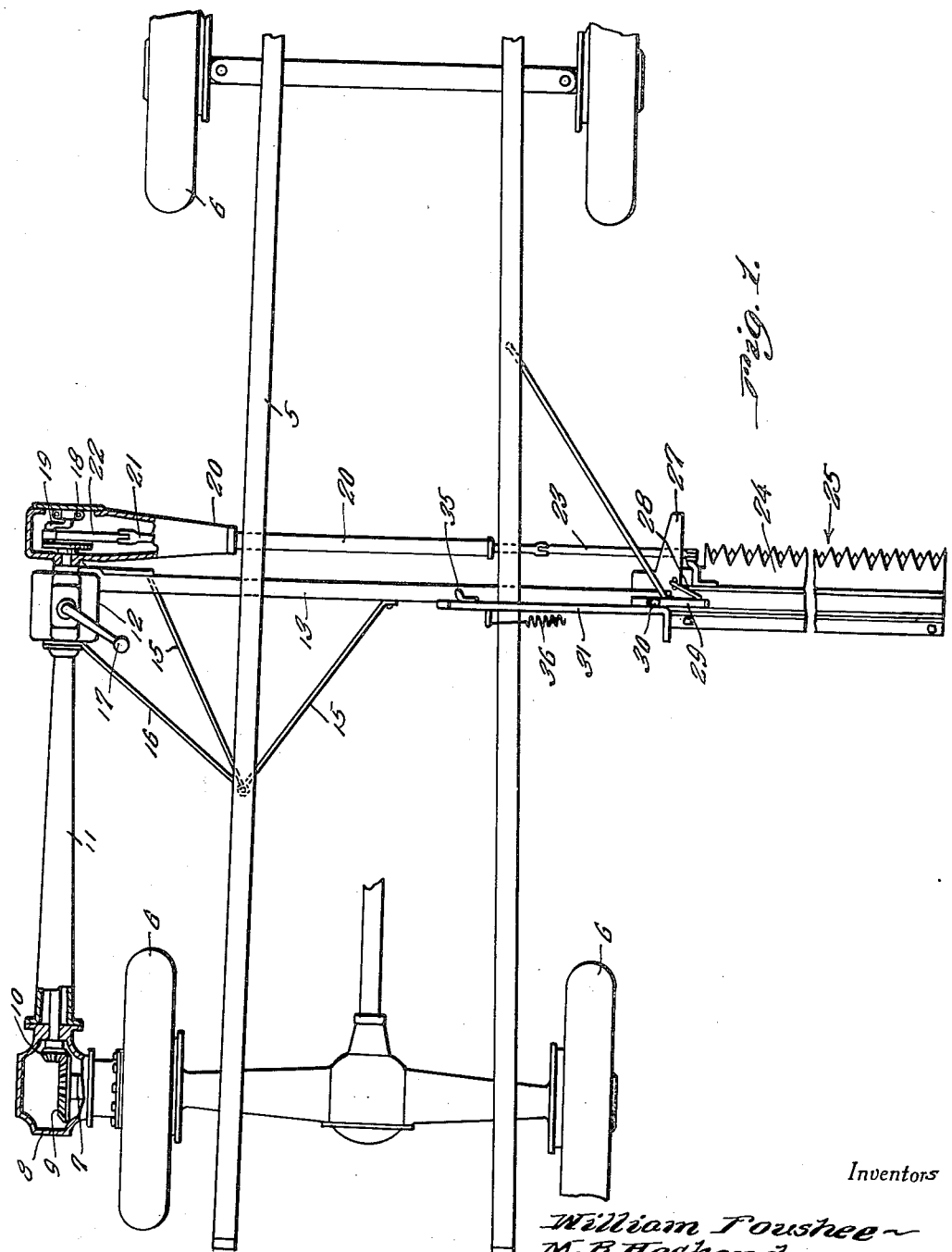

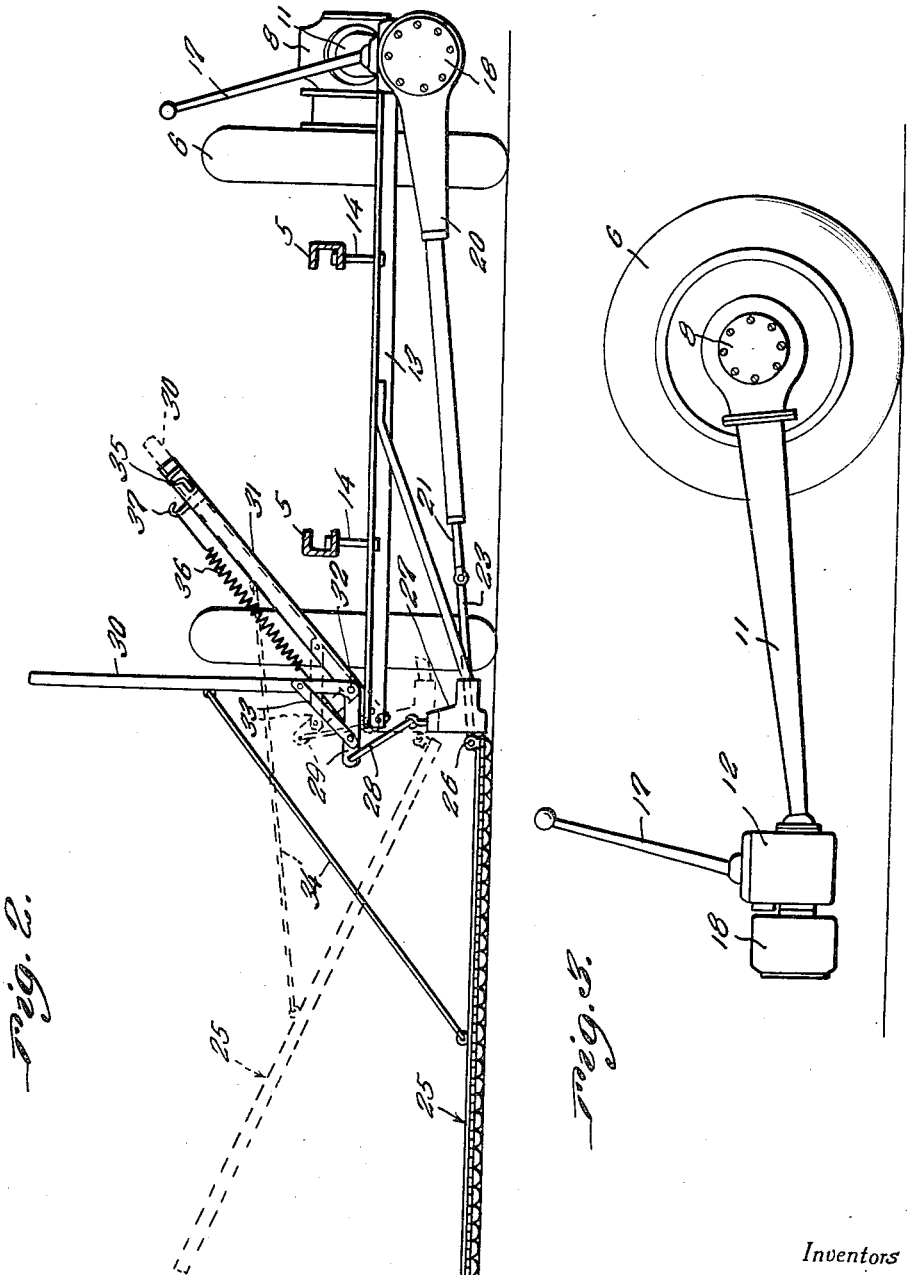

2,098,948

UNITED STATES PATENT OFFICE 2,098,948

MOWER

William Foushee and Marson B. Heckendorn, Cedar Point, Kans.

Application July 29, 1936, Serial No. 93,266

2 Claims. (Cl. 56—25)

This invention relates broadly to mowers and more particularly to a mower attachment for motor operated vehicles.

In accordance with the present invention a mower attachment is provided whereby the chassis of a vehicle may be utilized for applying thereto the mower attachment operable from the rear wheel of the vehicle and mounted on one side of the chassis, said attachment being disposed in a laterally projecting position to mow either crops or if desired grass and weeds growing alongside of the road, and which also can be swung upwardly into a more or less out-of-the-way position.

The invention together with its objects and advantages will be best understood from a study of the following description taken in connection with the accompanying drawings wherein:—

Figure 1 is a plan view illustrating the application of the invention, certain parts being broken away and shown in section.

Figure 2 is a front elevational view also showing the attachment applied.

Figure 3 is a detail side elevational view illustrating certain features hereinafter more fully referred to.

Referring to the drawings more in detail it will be seen that the reference numeral 5 indicates a vehicle chassis; while the wheels of the vehicle are indicated by the reference numeral 6 and the rear axle of the vehicle by the reference numeral 7.

In accordance with the present invention there is suitably mounted adjacent one of the rear wheels 6 of the automobile a gear casing 8 in which is housed a beveled gear 9 suitably provided on one end of the rear axle 7. The gear 9 is in mesh with a smaller beveled gear 10 also housed within the casing 8 and provided on one end of a shaft that extends through a housing 11 provided therefor. The housing 11 extends between the gear case 8 and a transmission housing 12 suitably mounted on one end of a bar 13 that is suspended transversely of the chassis 5 as at 14. The bar 13 is braced with respect to the chassis frame 5 as indicated generally at 15. Also, the transmission casing 12 is braced with respect to the chassis frame 5 as at 16. Housed within the transmission case 12 is a conventional automotive vehicle transmission gearing while for changing the speed of the transmission there is provided a gear shift lever 17.

Suitably mounted adjacent one end of the transmission housing 12 is a crank case 18 in which is journaled the crank-equipped end 19 of the transmission shaft.

Extending from the crank case 18 is a suitable housing 20 in which operates a rod 21 one end of which is connected with the crank 19 of the transmission shaft through the medium of a connecting rod 22.

At its relatively opposite end the rod 21 is pivotally connected to a pitman rod 23 that has the usual ball and socket connection with the reciprocating cutting blade 24 forming part of a mower mechanism indicated generally by the reference numeral 25.

The mower mechanism 25 is pivoted at one end as at 26 to a casting or head member 27 that is suspended through the medium of a link 28 from the laterally directed end 29 of a hand lever 30.

Suitably mounted at an incline at one end of the bar 13 is a bracket 31 to the lower end of which is pivoted as at 32 the lever 30. The end 29 of lever 30 is braced with respect to the lever through the medium of a diagonal brace 33.

When it is desired to hold the cutter bar 25 in an upright position, as when the mower is not in use, link 34 connected with an intermediate portion of lever 30 is engaged with the mower mechanism 25 to secure the mower mechanism or cutter bar in an upright position. When the mower is in use, link 34 is disengaged from both the cutter bar or mower 25 and lever 30. Thus it will be seen that when desired the mower mechanism 25 may be raised or swung from the operative position shown in full line in Figure 2 to the dotted line position shown in Figure 2 by swinging the lever 30 in a clockwise direction to a position parallel with the bracket 31. Adjacent its upper end bracket 31 is provided with a suitable clip 35 with which the free end of the lever 30 is engaged for retaining the parts in the dotted line position shown in Figure 2.

To assist in raising the parts to the dotted line position shown in Figure 2 the lever adjacent its pivot 32 is connected with one end of a coil spring 36 the other end of which is suitably engaged with a hook or the like provided therefor adjacent the upper end of the bracket 31.

From the above description it will be apparent that as the chassis 5 is of the usual vehicular construction it can be operated at normal speed. As the vehicle moves forwardly drive from the rear wheel is transmitted through axle 7, and gearing 9, 10, to the transmission shaft and from the transmission shaft through the crank 19, connecting rod 22, rod 21, and pitman 23 to the reciprocating cutter 24 of the mower for operating the mower as the vehicle moves along.

Also the speed of operation of the mower 24 may be controlled by the transmission 12, lever 17 being manipulated in a well-known manner for changing the speed of operation.

Also, when it is not desired to use the mower, but it is desired to raise the mower 25 to clear objects in the path thereof, the mower 25 may be swung to the dotted line position shown in Figure 2 swinging the lever 30 in a clockwise direction as hereinabove described in detail.

It is thought that the construction, utility and advantages of an invention of this character will be had without a more detailed description, and it is of course understood that the casings 8, 11, 12 and 18 and 20 are filled to a suitable level with oil for lubricating purposes.

Having thus described the invention what is claimed as new is:—

1. A mower attachment for motor driven vehicles, comprising a bar adapted to be suspended transversely from the chassis frame of a motor driven vehicle, a transmission housing on one end of said bar, transmission mechanism in said housing, driving mechanism for connecting the transmission mechanism with one of the driving wheels of the motor driven vehicle, a hand lever pivotally mounted on said bar, a head member suspended from said hand lever, a mower mechanism pivoted at one end thereof to said head member, link means connecting said lever intermediate its ends with said mower whereby rocking movement of the lever is transmitted to the mower for swinging the latter about its pivot to raise or lower the mower, said mower including a reciprocating cutter bar, and mechanism operatively connecting the transmission mechanism with the cutting bar of the mower for reciprocating the latter.

2. A mower attachment for motor driven vehicles, comprising a bar adapted to be suspended transversely from the chassis frame of a motor driven vehicle, a transmission housing on one end of said bar, transmission mechanism in said housing, driving mechanism for connecting the transmission mechanism with one of the driving wheels of the motor driven vehicle, a hand lever pivotally mounted on said bar, a head member suspended from said hand lever, a mower mechanism pivoted at one end thereof to said head member, link means connecting said lever intermediate its ends with said mower whereby rocking movement of the lever is transmitted to the mower for swinging the latter about its pivot to raise or lower the mower, said mower including a reciprocating cutter bar, and mechanism operatively connecting the transmission mechanism with the cutting bar of the mower for reciprocating the latter, said transmission mechanism including a gear shift lever for controlling the transmission mechanism, and clip means suitably mounted on said bar for engaging said lever to releasably retain the mower in a substantially raised position.

WILLIAM FOUSHEE.
MARSON B. HECKENDORN.